INVENTORS
Eric V. Bergstrom and
Edward R. J. Sorf
BY Charles A. Huggett
ATTORNEY

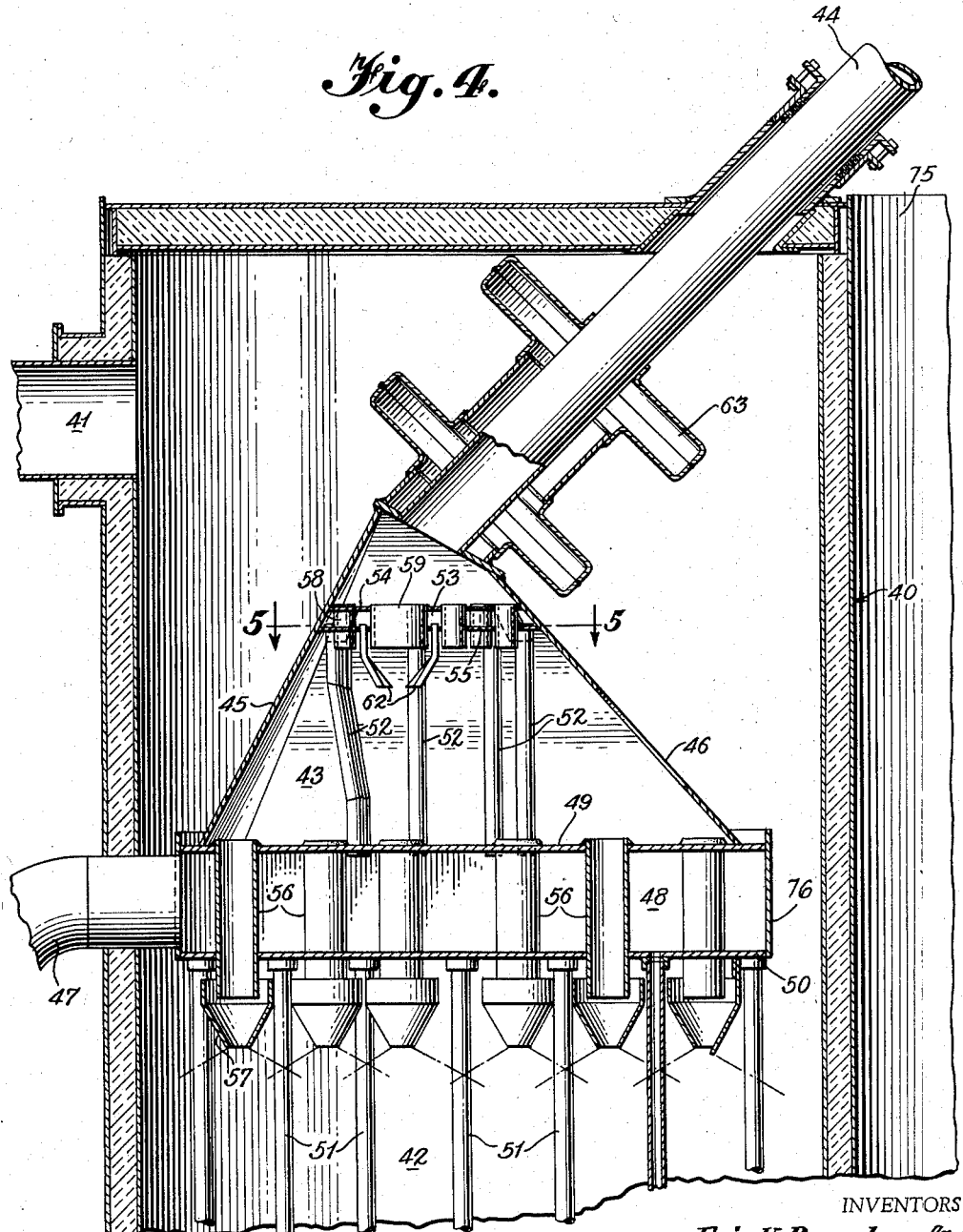

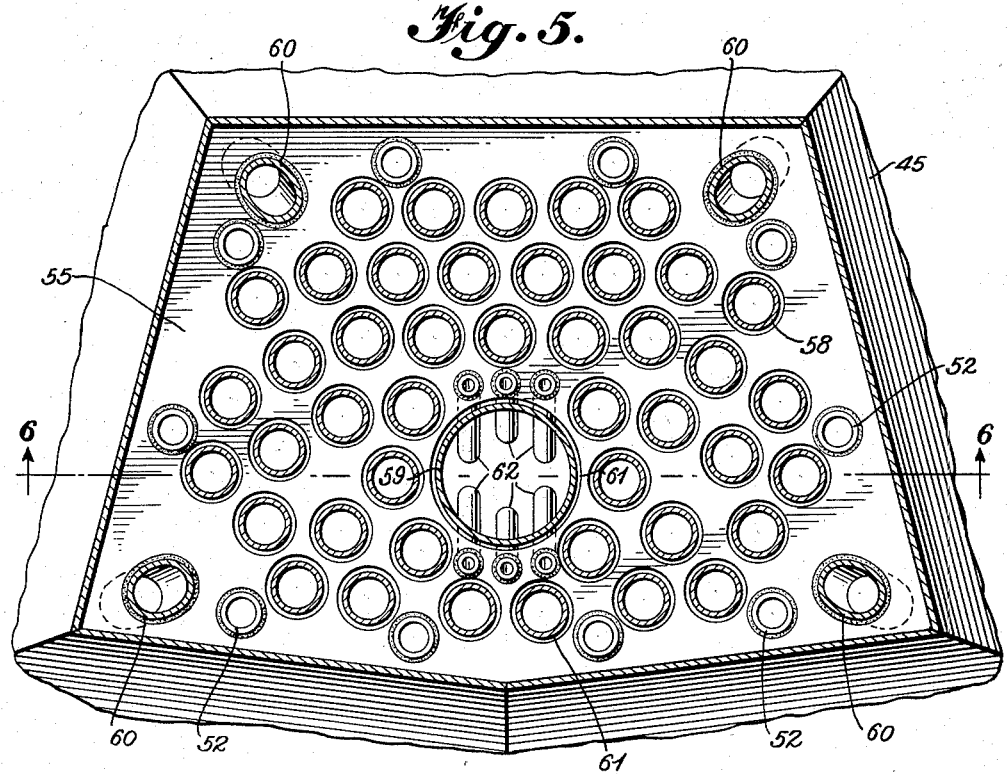
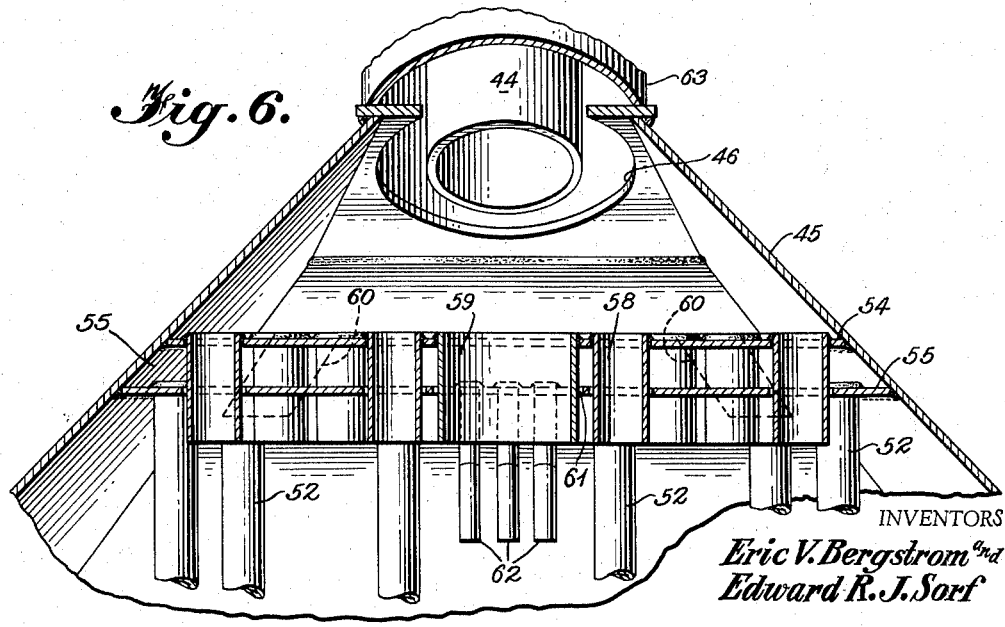

2,902,438

PREVENTION OF PLUME FORMATION IN A GRAVITATING SOLIDS-HYDROCARBON CONVERSION PROCESS

Eric V. Bergstrom, Short Hills, and Edward R. J. Sorf, Fanwood, N.J., assignors to Socony Mobil Oil Company, Inc., a corporation of New York Application September 24, 1954, Serial No. 458,180

2 Claims. (Cl. 208—165)

This invention relates to improvements in the method and apparatus for the continuous conversion of or transformation of hydrocarbons in the presence of a granular contact material. It is particularly concerned with improvements in the contact material regeneration system of such processes.

Typical of processes to which this invention applies is the catalytic conversion of high boiling hydrocarbons to lower boiling hydrocarbons wherein a granular, adsorbent, catalytic contact material is passed cyclically through successive zones or vessels, in the first of which it is contacted with a high boiling hydrocarbon charge at temperatures of 850° F., and upward, to effect the conversion of said charge to lower boiling hydrocarbons which may contain large percentages of gasoline, and in the second of which contaminants deposited on the contact material are removed so that the contact material will be in a suitable condition for re-use in the conversion zone. Other exemplary processes are thermal vis-breaking, coking or cracking of hydrocarbon charge by contact with heated granular inert contact materials, or the reforming of gasoline-boiling constituents in the presence of suitable catalyst for the purpose of improving the fuel quality.

In processes wherein the contact material is catalytic in nature, it may partake of the nature of natural or synthetic clays, bauxite, activated alumina or synthetic associations of silica, alumina or silica and alumina to which other substances, such as certain metallic oxides, may be added in small amounts. When the contact material is inert in character, it may partake of the form of refractory materials, such as mullite, or it may partake of the form of stones, or metallic particles, or balls, or particles of coke.

The contact material should be of palpable particulate form as distinguished from finely divided powders, and the term "granular," as used herein, should be understood to include any contact material of this form. The contact material may take the shape of pellets, tablets, spheres, capsules, or particles of irregular shape, such as are obtained from grinding and screening operations. Generally, the contact material granules should be within the range 3 to 100 mesh and, preferably, within the range 4 to 20 mesh by Tyler standard screen analysis.

In processes of the above-mentioned types, the cracking of the high boiling hydrocarbons to lower boiling hydrocarbons results in the deposition of carbonaceous or more properly, hydrocarbonaceous contaminants on the contact material. These hydrocarbonaceous contaminants consist principally of compounds of hydrogen and carbon, sometimes with impurities, such as sulfur and nitrogen, etc., compounds present. Often, at least a portion of the deposit may comprise tarry or heavy oily hydrocarbon material, or heavy organic material. These carbonaceous contaminants must be removed before the contact material can be reused for conversion. The usual method of removal is by burning these contaminants off with an oxygen-containing gas, such as air, the oxygen-containing gas being converted to flue gas. During the transfer of the contact material to the regeneration chamber, a portion of the contaminant deposit, usually the heavy hydrocarbon portion, may be converted to lower boiling combustible material, or hydrocarbons which are vaporized under the existing operation temperatures. These materials vaporize either during transfer of the contact material to the regeneration vessel, or while the material remains in a supply bed above the regeneration zone proper. This vaporized organic or hydrocarbon material disengages from the supply bed in the top of the regenerator and mixes with the effluent flue gas therein and passes from the regenerator with the flue gas into the atmosphere, generally through a stack. In addition to conversion of the hydrocarbonaceous deposit, combustible vapors may be carried into the regeneration zone in the voids between contact material particles where the purging of the contact material as it leaves the conversion zone, is not adequate. Also, vapors may exist in the pores of the contact material which will expand under the lower pressure of the regeneration zone. A further source of combustible vapors is from liquid material in the contact material which vaporizes under the reduced pressure of the regeneration zone. More efficient purging of the contact material with inert gas as it leaves the conversion zone is not a complete answer to this problem, since purging only removes the vaporized material in the void spaces between contact material particles and will not remove those portions of the contaminant deposit which may be converted during transfer to the regeneration zone, any vapors in the pores of the contact material, or liquid hydrocarbons in the contact material.

The contact material is discharged from the bottom of the supply zone onto the top of the gravitating substantially compact mass of solids in the regeneration zone. Air is introduced into the regeneration zone at one or more intermediate levels to travel upwardly through part of the bed and downwardly through the other part of the bed, thereby burning contaminant from the solid material. In the uppermost portion of the regeneration zone, the gas is passed upwardly and disengages from the solid mass at the top of the regeneration zone. This gas mixes with the gas distilled from or discharged from the granular material in the supply zone and the combined stream of gas is discharged into the gas stack for discharge into the atmosphere. The oxygen content of the gas discharged from the top of the regeneration zone is generally low and, in the newer moving bed systems, may be less than about 3 percent by weight. While the temperature of the gas is high enough to effect combustion, therefore, the low oxygen content provides only partial combustion. Furthermore, the temperature of the mixed stream of gas rapidly drops below the combustion temperature. Thus, the gas discharged from the kiln during regeneration has heretofore carried with it a certain quantity of undesirable hydrocarbons which commingle with the atmosphere and cause the color of the gas to bear a yellowish or orange hue. This has been termed a "smoke plume" or simply "plume." Inasmuch as the refineries in which these cracking processes are located are usually in or near large cities, it is undesirable to contaminate the atmosphere with this material and efforts have been made to eliminate the plume. This invention is directed to the prevention of this type of air pollution.

Other objects and advantages of this invention will be apparent upon consideration of the following detailed description of several embodiments thereof in connection with the annexed drawings, wherein:

Figure 4 is a view in vertical section of a kiln of the type shown in Figure 1, but with a modified type of burner according to the teachings of the present invention;

Figure 5 is a view in transverse section taken on the line 5—5 of Figure 4; and

Figure 6 is a view in vertical section taken on line 6—6 of Figure 5.

Figure 1:
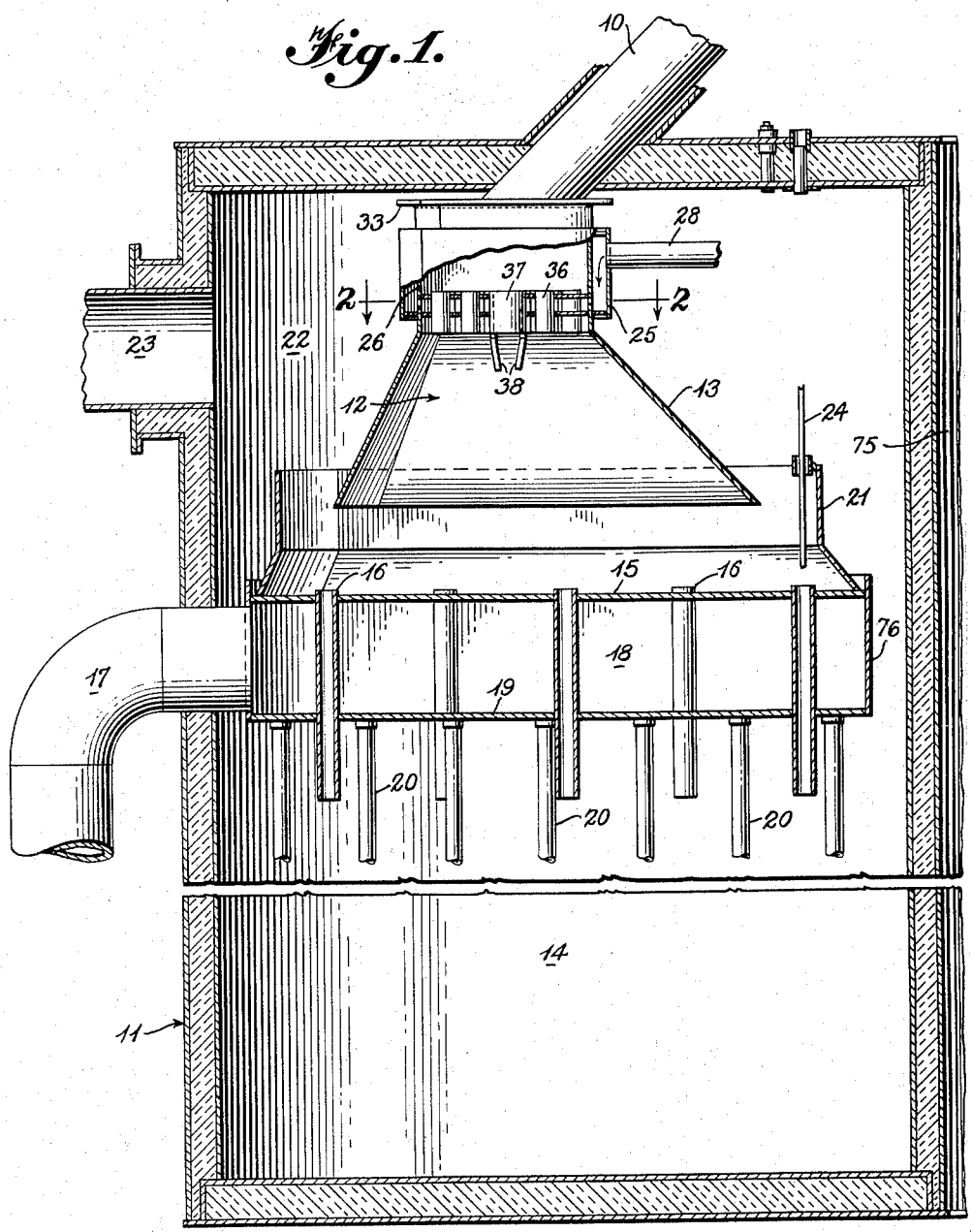
Figure 1 is a fragmentary view in vertical section of a kiln of the type used in the regeneration of moving bed catalysts, the burner of the present invention being shown in detail.

Before describing in detail the structures depicted in the drawings, it is deemed desirable to describe the invention in general terms.

The invention discloses a method and apparatus for the regeneration of used granular contact material wherein the used contact material is supplied to a bed of contact material in a confined supply zone or plume burner bearing a carbonaceous deposit and having combustible vapors associated therewith. Air, or other gas having a suitably high oxygen content, is introduced into the supply zone in amounts sufficient to burn the combustible vapors, without causing any material increase in the temperature of the solid material. The air is passed in concurrent flow with the contact material and withdrawn at or near the bottom of the supply zone. The used contact material is gravitated from the supply zone into the upper section of a confined regeneration zone and passes therethrough as a substantially compact column. An oxygen-containing gas, such as air, is passed through this column under conditions suitable for the burning of the remaining hydrocarbonaceous contaminants on the contact material, with the gas being passed in countercurrent flow with the solids at least near the top of the zone. The flue gas discharged from the column is mixed with the gas discharged from the supply zone at or near the top of the regeneration zone and discharged from the regenerator to the atmosphere.

Figure 2:
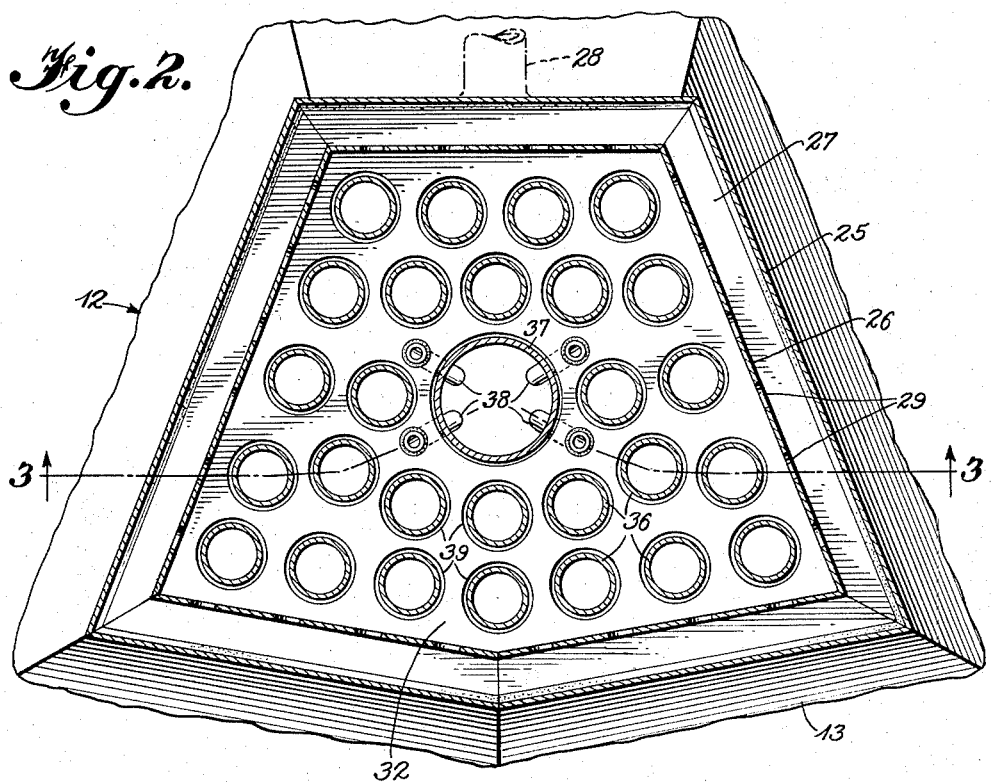
Figure 2 is a view in transverse section taken on the line 2—2 of Figure 1.
Figure 3:
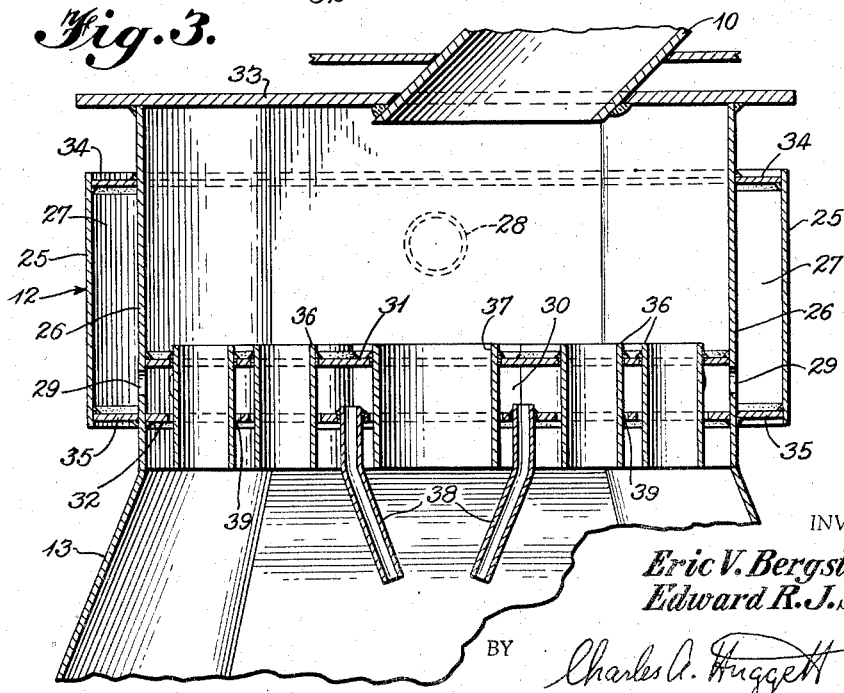
Figure 3 is a view in vertical section taken from the line 3—3 of Figure 2.

The current moving bed cracking process now used widely for cracking heavy hydrocarbons to produce increased amounts of motor gasoline, comprises a continuous system with the reactor being located above the kiln or regenerator and connected thereto by means of suitable conduits. Catalyst is elevated from a level beneath the kiln by pneumatic means to a separating vessel above the reactor and the catalyst is gravitated as a compact stream from the separator downwardly through an elongated gravity feed leg into the reactor. The feed leg is long enough to permit the catalyst to feed smoothly into the reactor against an advanced pressure, such as about 10 p.s.i. gauge. The reacting material is prepared for treatment and introduced into the reactor as a vapor, liquid or mixture thereof, and passed through the void spaces in the bed. The cracked products are removed from the bed continuously. The catalyst is contacted with a stripping gas in the bottom of the reactor to remove as much of the reaction product or reaction material as possible, and the stripped solids pass in compact form to the top of the regenerator, with the pressure being reduced on the solids, usually during transfer to the regenerator, to about atmospheric. As can be seen in Figures 1, 2 and 3, the conduit 10 leads the spent contact material from the reactor, not shown, into a plume burner or confined supply zone located in the regenerator 11 above the regeneration zone generally designated at 14. The regenerator 11 is of annular cross-sectional shape. Beneath the regenerator 11 is a lift tank, not shown, which is connected to the bottom of the regenerator by conduits depending from the bottom of the regenerator. The lift pipe projects substantially vertically upward from the top of the lift tank passing through the central opening 75, as shown on Figures 1 and 4, in the regenerator. The Figures 1 through 4 represent, therefore, a cut through one side of the annular regenerator, with the other side being arranged substantially equivalent. A series of conduits 44 are arranged about the top of the annular regenerator to feed the catalyst uniformly about the top of the vessel. The overall moving bed system is described in more detail in co-pending application, Serial Number 265,628, filed January 9, 1952, with the supply chamber arrangement in the top of the regenerator being disclosed in considerable detail, and illustrated particularly on Figure 3 of that application.

Referring specifically now to Figures 1, 2 and 3, contact material issuing from the conduit 10 passes through the supply zone or plume burner 12, which includes a depending skirt or hood portion 13. It then passes downwardly to a regeneration zone generally designated at 14. Both the supply and pre-burning zone 12, and the regeneration zone 14, are within the insulated wall of the regenerator 11, although the pre-burner could, if desired, be located outside of said vessel. Since it is desired, however, to keep the height of the unit from becoming excessive, the burner is most suitably located in the uppermost portion of the regenerator, occupying only that space normally required to expand the column of catalyst discharged through the conduit 10 to a column covering substantially the entire cross-section of the vessel, or that portion of the vessel served by conduit 10.

In the uppermost portion of the regenerator or kiln 11, is located a plurality of wedge-shaped header boxes 18 uniformly distributed about the annular cross-section of the vessel, but covering less than the entire cross-section. Space is left between adjacent boxes 18 and between each header box and the inner and outer walls of the vessel so that gas flowing upwardly can pass by the boxes to reach an exit in the top of the kiln 11. One of the header boxes 18 is illustrated on Figure 1, being formed by horizontal plates 15 and 19, and vertical end walls 76. The header box 18 provides an enclosed gas manifold. Air is introduced into the manifold 18 through conduit or pipe 17, and this air is discharged through a plurality of drop pipes 20, to a discharge level intermediate the top and bottom of the regeneration zone. The air stream splits on discharge with some passing concurrently with the gravitating catalyst to effect final burning of the contaminants on the catalyst. The flue gas formed is withdrawn near the bottom of the regeneration zone and discharged through an exhaust stack. The remaining portion of the air travels upwardly from the discharge level through the mass of catalyst to effect initial burning of the contaminant. The gas, with its oxygen content substantially exhausted, issues from the top of the catalyst bed at the upper end of the regeneration zone and passes around the header box or gas manifold 18, in the space provided for this purpose, and is withdrawn from the kiln 11 through the pipe 23 and a suitable exhaust stack, which communicates freely with the atmosphere.

A large number of vertical pipes 16 pass through the header box 18 to feed catalyst from a pile or mass located on the upper sheet 15 of the box, and distribute it uniformly across the cross-section of the regeneration zone 14. The pipes 16 project only a short distance below the bottom sheet 19, of the header box 18, so as to provide a gas disengaging space beneath the header box. The pipes 16 are long enough, however, to prevent any substantial amount of gas from passing upwardly through the pipes rather than through the desired gas flow path around and between adjacent header boxes. An upwardly extending wall 21 is located on the top of the header box 18, or each header box, being continuous about each box to provide lateral confinement of the column of catalyst so that the entire flow of catalyst is restricted to the pipes 16. A probing rod 24 is shown on Figure 1 for checking the level of catalyst mass within the enclosing wall 21.

If, now, reference is made to Figures 2 and 3, the actual structure of the upper portion of the plume burner of the present invention will be described. The plume burner is wedge-shaped and corresponds in plan view to the plan of the header box with which it cooperates. The upper section of the burner is pentagonal in shape, as shown on Figure 2, being formed by vertical walls 26 and cover 33. The conduit 10 discharges through the cover 33. Spaced below the discharge end of the conduit 10 is in an upper horizontal sheet 31, on which the catalyst accumulates in the form of a pile. The sheet 31 is sufficiently below the end of conduit 10, so that the pile of catalyst covers the sheet 31. A multiplicity of pipes 36 are distributed across the tube sheet 31. A second horizontal sheet 32, is located a spaced distance below the upper sheet 31, so as to provide a gas plenum chamber 30. The pipes 36 project through this sheet 32. Annular openings are left in sheet 32 about each pipe to provide passage for gas from the plenum zone 30, into the confined region therebelow. Spaced outwardly from the vertical wall 26, are vertical members 25 connected continuously about the wall of the pre-burner. The space between the members 25 and the vertical wall 26, is enclosed by the horizontal roof 34 and floor 35, thereby providing a continuous gas manifold about the top of the pre-burner. A series of orifices 29 are cut in the vertical wall of the burner and communicate the manifold 12 with the plenum chamber 30. The openings 29 are uniformly distributed about the pre-burner, as shown on Figure 2. The apertures 29 are sized to provide a substantial pressure drop thereacross, providing substantially uniform gas distribution to all parts of the plenum chamber 30. Similarly, the annular apertures 39 about the catalyst transfer pipes 36, are sized to provide a substantial pressure drop, so that gas is distributed uniformly across the catalyst bed. Air is supplied to the manifold 12 through the pipe 28.

The contact material discharged from pipe 10 first enters the space below the cover 33 and above the sheet 31. The catalyst is then passed downwardly through the conduits 36, which are of uniform size, and which are symmetrically distributed around a larger central conduit 37. These conduits subdivide the flow of contaminated contact material and distribute that flow, more or less, evenly within the zone defined by the hood 13. Air, which is supplied through conduit 28, manifold 27, and apertures 29, enters the plenum chamber 30 and, from there, flows through the orifices 39 to engage the contact material below pipes 36. This system of air distribution has been found to provide uniform gas flow through the mass of catalyst in the conical shaped hood 13, thereby burning the undesirable plume forming constituents from the catalyst without substantially raising the temperature of the catalytic mass. As a safety measure to insure continuous flow of catalyst under all possible circumstances, the large diameter pipe 37, has been provided. In order to insure that adequate air is supplied to the region beneath the large pipe, a plurality, such as, for example, four pipes 38 have been located dependent from the lower sheet 32, about the exterior of pipe 37, and terminated in the region directly below the pipe. These pipes 38, therefore, carry an additional supply of air to the catalyst mass at a point or points directly below the large diameter pipe 37. The hood 13 is of generally pyramidal shape, terminating at its lower end within the bounds and beneath the top of the vertical confining wall 21. The catalyst, therefore, travels in compact form downwardly through the region 12, enclosed by the hood 13, and discharges from the hood onto the mass of contact material confined between vertical wall 21 above the header box 18. The distance across the hood at the lower end thereof is substantially less than the distance from one side of confining wall 21 to the opposite wall, thereby leaving a sufficient horizontal space about the hood 12 where the catalyst forms a free upper surface and the gas is enabled to disengage from the catalyst and flow upwardly into the region 22 about the exterior of the hood 13. Thus, the products of combustion of the pre-burner zone are admixed in the regeneration zone and transferred upwardly about the header box to the withdrawal conduit 23. The gas streams mingle in the region 22 about the hood 13 and are removed together through the conduit 23 to a stack, not shown, through which they eventually reach the atmosphere. The sides of the frusto-conical or frusto-pyramidal hood 13 preferably make an angle with the horizontal greater than the normal angle of repose of the contact material. By this means, segregation of the contact material according to particle size as it passes through the pre-burner is prevented, since, if the bed therein were allowed to assume its normal angle of repose, the larger particles would tend to accumulate toward the outer portions of the bed and the smaller particles would accumulate near the center. This would lead to channelling of the gas flow in the regeneration zone. The normal angle of repose usually is within the range about 25 to 40 degrees with the horizontal. As previously indicated, the catalyst discharged from the conduit 10 has associated with it the combustible vapors. These vapors consist principally of condensible and non-condensible hydrocarbons. These vapors are burned as soon as the air distributed from the plenum chamber 30 contacts the catalyst and the combustion of these vapors is substantially completed by the time the vapors disengage from the catalyst around the lower end of the hood 13. The catalyst is thereafter supplied by means of the conduit 16 to the top of the gravitating mass of catalyst in the regeneration zone 14, and the coke contaminant on the catalyst is largely or substantially completely removed therefrom during passage through the regeneration zone. The regenerated catalyst is withdrawn from the bottom of the regenerator 11, and transferred back to the top of the reaction zone for re-use in the process. The cracking conversion occurs at elevated pressure of, say about, 10 pounds, and, at this pressure, a certain amount of normally liquid and vaporized oils are adsorbed in the pores of the catalyst. This oil is not removed by the seal gas or purging gas at the bottom of the reactor, which is introduced at that point to strip the wet material from the catalyst as it leaves the reaction zone. Therefore, the catalyst transferred from the reactor to the top of the kiln, contains a solid or substantially solid carbonaceous deposit in addition to the liquid or vaporized hydrocarbonaceous material. At the lower pressure prevailing in the kiln, this lighter material tends to leave the pores of the catalyst as free gas. It is this material that is burned within the hood 13 and leaves the system in innocuous form through a discharge conduit 23.

The form of the invention shown in Figures 4, 5 and 6 is generally similar to Figures 1 through 3 inclusive, except that the air for the pre-burners is supplied by tapping the main air duct. In Figures 4 through 6 inclusive, the numeral 40 represents the regeneration chamber or kiln. The chamber 40 is provided with a stack outlet 41. The regeneration zone is generally designated by reference numeral 42 and the pre-burner zone by reference numeral 43. The spent contact material is introduced into the kiln 40 through a chute 44, which discharges into the top of a somewhat frusto-conical hood 45. The hood 45 contains the pre-burner zone 43 and has a gas outlet port at 46. Air is admitted to the kiln 40 through a duct 47, which leads to a header zone 48, located between spaced parallel tube sheets 49 and 50. From the header space 48, air is delivered through conduits 51 to the middle of the regeneration zone 42 in order to support the combustion which burns off the carbonaceous contaminants on the contact material. The tube sheet 49 supports a plurality of conduits 52, which lead upwardly to a header zone 53, located near the upper end of the hood 45 and defined between parallel spaced tube sheets 54 and 55. The tube sheet 49, in addition to supporting the air conduits 52, likewise supports a plurality of contact material conduits 56, which pass from the pre-burner zone 43, through the header 48, to the regeneration zone 42. These conduits 56 lead to funnels 57, which distribute the contact material to form the moving bed in the regeneration zone 42, of the kiln.

The contact material discharged from the chute 44, is conducted through the header zone 53 by a group of small conduits 58, by a single large central conduit 59, and by four diagonally extending corner conduits 60. The arrangement of conduits 58, 59 and 60, is such as to bring about an even distribution of the contact material in the space defined by the hood 45.

Within the space below the tube sheets 55 and above the tube sheets 49, pre-burning occurs. To this end the air, which is supplied from conduit 47, header 48, tubes 52 and header 53, is distributed through annular ports 61 surrounding the conduits 58 and 59. These annular ports are made by cutting the holes in the tube sheet 55 oversize in relation to the respective contact material conduits.

From the foregoing description, it will be appreciated that the contact material enters the kiln 40 under pressure and temperature conditions conducive to releasing gaseous plume forming hydrocarbons which is contacted with fresh combustion supporting air in zone 43, whereby gaseous contaminants are burned before the contact material is delivered to the main regeneration zone for removal of the solid coky contaminants which render the reactivation necessary.

In the embodiment shown on Figure 4, the gas for the pre-burner is supplied upwardly through the conduits 52 and uniformly distributed across the region between tube sheets 54 and 55, and then is distributed uniformly through the annular orifices surrounding each catalyst transfer pipe to travel downwardly with the catalyst under the confining hood 45. The catalyst and gas from the pre-burning zone pass through the conduits 56, which extend through the header box 48 and discharge into cup members 57. The cup members 57 have a discharge outlet at their lower end of smaller cross-section than the cross-section of the pipes 56, thereby maintaining within the cup, at all times, a compact mass of catalyst. The upper end of the cup members extend a substantial distance above the lower end of the transfer pipes 56. The catalyst discharge from the transfer pipe 56 spreads outwardly in accordance with the angle of repose of the catalyst to form a free surface in the cup members, and this provides a region in which the gases travelling with the catalyst can disengage therefrom and travel upwardly and out of the upper ends of the cup members 57. The disengaged gases then mingle with the gases being discharged from the upper surface of the catalyst in the regeneration zone 42, and the commingled gases pass around the header box 48 and discharge together from the regeneration vessel through the outlet 41 located near the top of the vessel. The confining hood 45 has side walls which slope at an angle with the horizontal greater than the angle of repose of the catalyst, similarly to prevent particle segregation while the catalyst stream is being expanded in size for delivery to the top of the catalyst column in the regeneration zone. It is noted that the confining hood 45 in this embodiment, extends downwardly to the upper sheet 49 of the header box 48 and makes a gas tight contact therewith, forcing all of the gas to flow downwardly with the catalyst through the transfer pipes 56.

In one suitable apparatus built according to this invention, and shown in part on Figures 1, 2 and 3, the regeneration vessel was of annular cross-sectional shape, having an outside diameter of 27' 7" and an inside diameter of 8' 9". The contact material column in the regeneration zone extended from a level 7' 10" from the top of the vessel to a level 6' 6" from the bottom of the vessel. A flue gas plenum chamber was provided above the column in the regeneration zone. There were eight conduits, 10 spaced around the top of the vessel, the top of the conduits being terminated at a distance of about 1" below the top of the pre-burner. These conduits were 8" pipes and were sealed so that gas could not discharge from the catalyst at any point between the bottom of the reactor and the interior of the pre-burner. Eight wedge-shaped pre-burners, similar to the embodiment shown on Figure 1, were located uniformly about the top portion of the regenerator and a 3" air inlet pipe 28 was attached to each burner to supply the air for combustion of the plume forming materials. Each 3" air pipe connects to a relatively large plenum chamber, 2¼" wide, 12" high, 9' 6" long, on the outside of each burner in such a manner so that the relatively high velocity jet issuing from the outlet of the 3" pipe is dissipated in space and does not affect distribution of air to the burner proper. The plenum chamber is kept relatively large so as not to recreate a velocity that would affect uniform introduction of air to all sides of the burner. As an added inducement toward this end, 24 1⅛" restrictive orifices conduct the air from the plenum chamber into the air distribution chamber within the burner proper. In order to insure uniform distribution of air from the distribution chamber onto the catalyst bed therebelow, a restrictive opening in the form of an annulus is provided around each of the 27 3" catalyst pipes and around the center 6" by-pass pipe. The restrictive openings providing for uniform distribution of air onto the catalyst bed are preferably in the form of annulus so as to attempt to surround the "shaft" of fume issuing from each catalyst pipe with a cylinder of air through which the fume will have to flow before being released from the burner. Without the plume burners in operation and when cracking of heavy oil with substantial amounts of the oil being supplied to the reactor in liquid form, a substantial plume was observed at the stack of the unit, being discharged into the atmosphere about the unit. When the plume burner was placed in operation by supplying air through the conduit 28 through each pre-burner, this plume was substantially or completely eliminated.

The examples and detailed description of the invention given hereinabove are not intended as a limitation of the invention, but are provided merely for purposes of illustrating the invention in a suitable form and environment. The only limitations intended are those provided in the appended claims.

We claim:

1. In a continuous cyclic process for the conversion of hydrocarbons wherein a granular contact material is passed cyclically through a conversion zone wherein it is contacted with a fluid hydrocarbon to effect conversion thereof to lower boiling hydrocarbons with resultant deposition of a hydrocarbonaceous contaminant on the contact material and through a regeneration zone wherein the contact material is contacted with an oxygen-containing gas to burn off the contaminant and wherein a portion of the contaminant becomes vaporized after the contact material has been discharged from the conversion zone and before it enters the regeneration zone, the improvement which comprises: withdrawing the used contact material from the conversion zone still at a temperature suitable for initiating combustion of the contaminant deposit, delivering said contact material to a plurality of confined pre-burning zones above the regeneration zone, to form therein gravitating compact beds of contact material having a restricted cross-section, sufficient to maintain a high contact material flow rate, said gravitating beds being maintained laterally confined out of communication with the gases from the regeneration zone for at least a substantial portion of the upper portion of said zones, introducing a limited flow of oxygen-containing gas into said pre-burning zones from confined plenum zones and at points uniformly distributed across the mass of contact material in the top of said zones, the pressure drop at each discharge point being substantial and sufficient to effect substantially uniform discharge of the gas from the plenum zone across the mass of contact material in the pre-burning zones, passing the gas in concurrent flow with the contact material and at a flow rate sufficient to burn substantially all of the combustible vapors without causing appreciable rise in temperature of the contact material, withdrawing the gas from the lower portion of the pre-burning zones and discharging it to the atmosphere, the depth of said pre-burning zone being limited to prevent any substantial rise in temperature of the catalyst as a result of the precombustion of said vapors, expanding the cross-section of the gravitating bed of contact material at least along the lower portion of said pre-burning zones, to gradually reduce the downward velocity of the granular particles and to expand the cross-section of the gravitating compact streams of contact material to fill the entire cross-section of the regeneration zone, and discharging the contact material onto the top of a gravitating mass of contact material at the top of the regeneration zone, introducing the regeneration gas into the regeneration zone at an intermediate level, to pass in part downwardly through the lower portion of the regeneration zone and in part upwardly through the upper portion of the regeneration zone, withdrawing the regeneration gas from the top of the regeneration zone substantially completely depleted in oxygen content and withdrawing the remaining regenerating gas and catalyst from the bottom of said regeneration zone.

2. In a continuous cyclic system for the conversion of hydrocarbons wherein a granular contact material is passed cyclically through a conversion chamber wherein it is contacted with a fluid hydrocarbon to effect conversion thereof to lower boiling hydrocarbons with resultant deposition of a hydrocarbonaceous contaminant on the contact material and through a regeneration chamber wherein it is contacted with an oxygen-containing gas to burn off the contaminant and wherein a portion of the contaminant deposit becomes vaporized after the contact material has been discharged from the conversion chamber and before it enters the regeneration chamber, the improvement which comprises in combination: at least one pre-burning chamber located above said regeneration chamber, having an upper portion with upwardly-extending, laterally-confining walls, adapted to confine the catalyst to a minor portion of the cross-section of said regeneration chamber, a cover on top of said pre-burning chamber, a conduit for the transfer of used contact material to said pre-burning chamber from said conversion chamber extending into the upper section of said pre-burning chamber, an upper substantially horizontal sheet located across the pre-burning chamber, a lower horizontal sheet located across the pre-burning chamber at a spaced distance below the upper sheet, so as to provide a gas plenum chamber between said upper and lower sheets, means defining a gas manifold about the walls of said pre-burning chamber, at least one conduit communicating with said manifold, to provide gas thereto, said manifold being communicated with said plenum chamber, a plurality of short pipes depending from said upper sheet and projected through said lower sheet, said pipes being uniformly distributed across the pre-burning chamber, so as to provide transfer of contact material through the gas plenum chamber, the lower sheet being cut back around each transfer pipe to provide an annular orifice for gas flow, the orifices being substantially equal and sized to provide a relatively substantial pressure drop, thereby providing uniform distribution of the gas across the pre-burning chamber, the lower portion of said pre-burning chamber having downwardly and outwardly sloping walls at an angle of about 35–50 degrees with the horizontal, means for transferring the contact material from beneath the pre-burning chamber to the top of a gravitating column of material in the regeneration chamber covering at least substantially the entire cross-section of said regeneration chamber, and means for withdrawing the gas from the contact material column located not substantially below the bottom of the outwardly sloping walls of said pre-combustion chamber, the height of said pre-combustion chamber being limited below that which would cause any substantial rise in temperature of the contact material as a result of said pre-combustion, gas introduction means terminated at a level intermediate the top and bottom of said regeneration chamber, at least one gas withdrawal pipe attached to said regeneration chamber at a level substantially above the level of gas introduction, and at least one withdrawal conduit at the bottom of said regeneration chamber for the removal of regenerated contact material.

References Cited in the file of this patent

UNITED STATES PATENTS

| | | |
|---|---|---|
| 2,465,255 | Moorman | Mar. 22, 1949 |
| 2,560,604 | Shabaker | July 17, 1951 |
| 2,561,331 | Barker | July 24, 1951 |
| 2,574,503 | Simpson | Nov. 13, 1951 |
| 2,625,467 | Barker | Jan. 13, 1953 |
| 2,672,407 | Leffer | Mar. 16, 1954 |
| 2,701,185 | Evans | Feb. 1, 1955 |
| 2,701,788 | Schutte | Feb. 8, 1955 |
| 2,753,295 | Ramella | July 3, 1956 |
| 2,775,547 | Ardern et al. | Dec. 25, 1956 |
| 2,838,461 | Kollgaard | June 10, 1958 |